Jan. 9, 1923.

J. H. KILLION.
CONTAINER.
FILED JAN. 23, 1920.

1,441,286.

2 SHEETS—SHEET 1.

Witnesses:
Benj. Schechter
Thos. S. Donnelly

Inventor
John H. Killion
By Joshua R. H. Potts
Attorney.

Jan. 9, 1923.

J. H. KILLION.
CONTAINER.
FILED JAN. 23, 1920.

1,441,286.

2 SHEETS—SHEET 2.

Witnesses.
Benj. Schechter
Thos. F. Donnelly

Inventor:
John H. Killion
By Joshua R. H. Potts
Attorney.

Patented Jan. 9, 1923.

1,441,286

UNITED STATES PATENT OFFICE.

JOHN H. KILLION, OF CHICAGO, ILLINOIS, ASSIGNOR TO SARAH L. A. KILLION, OF CHICAGO, ILLINOIS.

CONTAINER.

Application filed January 23, 1920. Serial No. 353,407.

*To all whom it may concern:*

Be it known that I, JOHN H. KILLION, a citizen of the United States, and a resident of the city of Chicago, county of Cook, and State of Illinois, have invented certain new and useful Improvements in Containers, of which the following is a specification.

My invention relates to new and useful improvements in containers, and has for its object the provision of a container, which will be simple in structure, economical in manufacture, and highly efficient in use.

Another object is the provision of a container especially adapted for berries and the like, having the side walls thereof formed from a continuous strip.

Another object is the provision in a container, having continuous side walls of means for securing the side walls in operative position.

Another object is the provision in a container having continuous side walls of supporting means therefor, which may be quickly assembled thereon.

Another object is the provision of a container which may be quickly and easily assembled for use.

Other objects will appear hereinafter.

The invention consists in the combinations and arrangements of parts hereinafter described and claimed.

Figure 1:
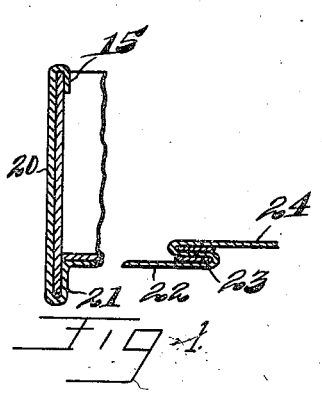
Figure 2:
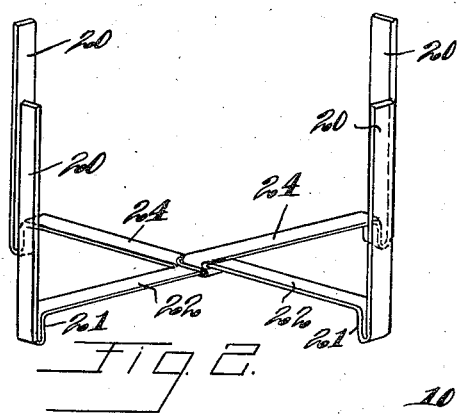
Figure 3:
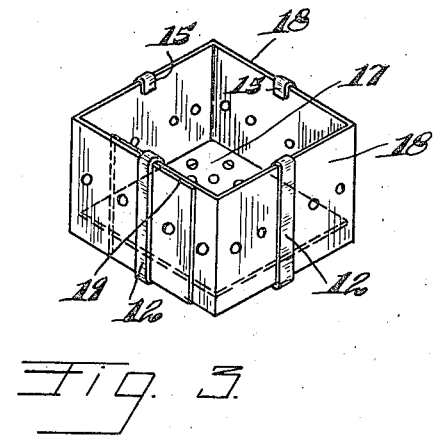
Figure 4:
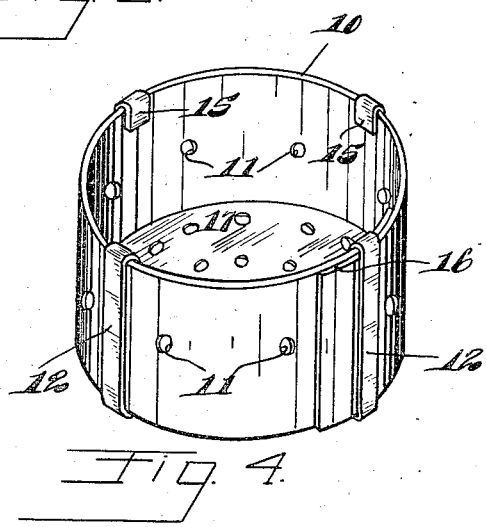
Figure 5:
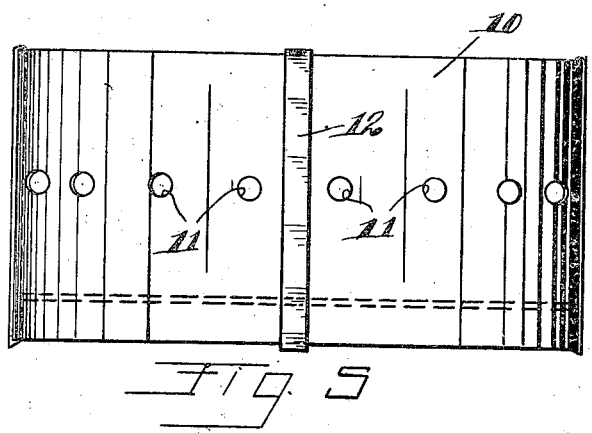
Figure 6:
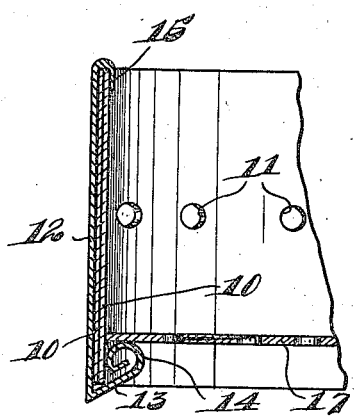
Figure 8:
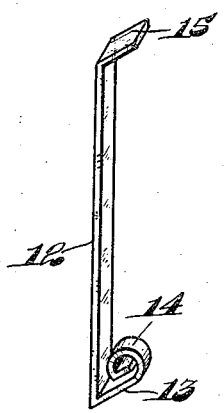
Figure 7:
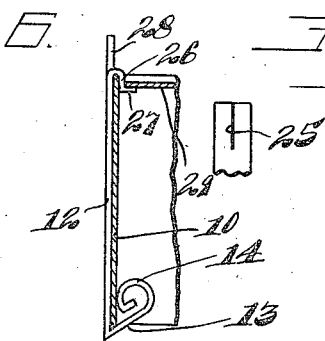

The invention will be best understood by reference to the accompanying drawings forming a part of this specification, and in which, Fig. 1, is a fragmentary sectional view illustrating the supporting members shown in Fig. 2, Fig. 2, is a perspective view of a supporting device used in the invention, Fig. 3, is a perspective view of the invention illustrating a square container, Fig. 4, is a perspective view of the invention illustrating a cylindrical container, Fig. 5, is a side elevational view of the device shown in Fig. 4, Fig. 6, is a fragmentary sectional view of the device shown in Fig. 5, illustrating a supporting member, Fig. 7, is a fragmentary sectional view illustrating a modified form of the supporting member, and Fig. 8, is a perspective view of the supporting member used in the invention.

The invention embraces a container especially adapted for packing berries and the like therein, but owing to the nature of the container, the same may be used for a multiplicity of purposes such as boxes or containers of this class are adapted for. As illustrated in Figs. 4, 5 and 6, the side walls 10 of the container are cylindrically formed from one continuous strip which may be formed of any suitable material, although preferably cardboard. As shown in the drawings, the side walls 10 are provided with perforations 11 which are designed to afford means of ventilating material contained in the box. The side walls 10, when in assembled or operative position, overlap as at 16 and a clamping member 12 is employed to retain the ends of the member 10 in overlapping position. The member 12 comprises a main body portion, the lower end of which is inclined upwardly relatively to the main body to form the portion 13, the extreme end of which is curled to form a portion 14, which lies in close relation to the main body portion. The member 12 is formed from some flat spring metal and the space separating the main body portion and the portion 14 is less than the width of the material which forms the side walls of the container, so that upon thrusting the lower edge of the side walls downwardly between the portion 14 and the main body portion, the member 13 is flexed outwardly from the main body portion, so that the lower edge of the walls 10 are securely clamped between the member 14 and the main body portion. The upper end 15 of the member 12 is designed to be bent downwardly over the upper edge of the side walls of the container, thereby preventing the displacement of the member 12 from the side walls 10. As shown in Fig. 6, the member 12 serves as a supporting member for the container, the extreme lower end of the member 12 engaging the surface of the object upon which the container may be placed.

Upon placing the members 12 upon the side walls of the container and previously to the bending of the ends 15 so as to engage the upper edge thereof, a perforated bottom 17 is placed within the container, and as shown in Fig. 6, the bottom 17 rests upon the portion 14 and is positioned above the lower edge of the side walls. The perforation of the side walls and of the bottom members affords a means for ventilating the goods contained within the container or box, but it is obvious that when the container is used for some articles, it would be desired to eliminate this feature, so that the side walls and the bottom member would not then be perforated. When using the container as a berry box, however, the perforated side walls and bottom are preferred.

In Fig. 3, I have illustrated a square container embodying the features of my invention. The side walls 18 are formed of one continuous strip, which overlap as at 19. The side walls are retained in their overlapping position in the same manner as already described and the members 12 are positioned around the sides for the purpose of providing supporting members and abutments for the bottom. In Figs. 1 and 2, I have illustrated a modified form of supporting the container which comprises upright members 20 doubled upon themselves at their lower end as at 21, the doubled over portion 21 being again turned to form a horizontally extending portion 22 which is twice doubled upon itself to form an S as at 23 and continuing in a horizontal direction to form the member 24. Four of these upright members are provided, the horizontally extending portions of which are at right angles to each other, each being bent in the manner described in an overlapping position. The side walls are positioned upon the supporting frame in an overlapping condition, and the lower edges thereof engage between the portion 21 and the lower end of the portion 20, so as to be securely clamped therein. The bottom is then positioned in the container and supported by the members 22 and 24, and the upper ends of the members 20 doubled over, as already described.

In Fig. 7, I have illustrated a modified form of a supporting member, in which the upper end of the member 12 is provided with a slit 25 so as to form two parts. One of the parts 26 is bent downwardly over the upper edge of the side wall and then outwardly therefrom to form a horizontally extending supporting portion 27. Upon this portion 27, a cover 29 is positioned and the other portion 28 of the member 12 is then bent downwardly so as to retain the same in position upon the portion 27.

As is evident from the structure of the container, the side walls, bottom, and the supporting members may be separately packed together for shipping and a container readily formed upon assembling the parts in the manner already described. With a container of this construction very little space is required for the storing of same, when in the knocked down form and very little time is required in assembling the different parts to form an operative construction.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent is:—

1. A container of the class described comprising side walls formed from a continuous strip; a loosely positioned bottom member; and a bottom rest formed from a single strip of material, the opposite ends of which being bent downwardly substantially at right angles and then back upon itself forming supports, and extending upwardly against the adjacent side wall, substantially as described.

2. A container of the class described comprising side walls formed from a continuous strip; a loosely positioned bottom member; and a bottom rest formed from a plurality of metallic strips each of which being folded centrally upon itself forming an S-shape and positioned substantially at right angles with respect to each other, the opposite ends of each of said strips being bent downwardly substantially at right angles and then back upon itself, forming supports, and extending upwardly against the adjacent side wall, substantially as described.

In testimony whereof I have signed my name to this specification in the presence of two subscribing witnesses.

JOHN H. KILLION.

Witnesses:
JOSHUA R. H. POTTS,
ROSE K. TRIB.